(12) United States Patent
Kukkula et al.

(10) Patent No.: US 6,771,717 B1
(45) Date of Patent: Aug. 3, 2004

(54) ARRANGEMENT AND METHOD FOR RESTRICTING WORD LENGTH

(75) Inventors: Ilari Kukkula, Oulu (FI); Juha Valtavaara, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 695 days.

(21) Appl. No.: 09/692,049

(22) Filed: Oct. 19, 2000

(30) Foreign Application Priority Data

Oct. 22, 1999 (FI) .............................................. 19992294

(51) Int. Cl.[7] .......................... H03D 1/00; H04L 27/06; H04L 23/00; H03M 7/00
(52) U.S. Cl. ..................... 375/343; 375/377; 375/340; 341/95
(58) Field of Search ............................... 375/142, 147, 375/148, 150, 240, 243, 254, 340, 343, 327, 371, 377; 341/95, 50

(56) References Cited

U.S. PATENT DOCUMENTS 4,882,754 A * 11/1989 Weaver et al. ................. 341/95
5,572,210 A * 11/1996 Toyoda ......................... 341/144
5,941,941 A    8/1999 Hasegawa .................... 708/551
6,301,292 B1 * 10/2001 Imaizumi et al. ........... 375/152

FOREIGN PATENT DOCUMENTS

JP          60175142        9/1985

OTHER PUBLICATIONS

"Finite Wordlength Effects Analysis and Wordlength Optimization of Dolby Digital Audio Decoder", Seokjun Lee et al., May 31, 1998, pp. 209–212.
"Fixed–Point Analysis and Simulation of AC–3 Algorithm", Il–Taek Lim et al., Oct. 19, 1997, 4 pages.

* cited by examiner

Primary Examiner—Betsy L. Deppe
(74) Attorney, Agent, or Firm—Perman & Green, LLP (57) ABSTRACT

The arrangement has circuits (308) for forming a quantization window to a word, the quantization window being determined to be shorter that the word length, circuits (308) for reducing the word length by cutting the bits remaining outside the quantization window from the word circuits, (312) for determining the amount of saturation caused by the reduction of the word length, and circuits (316) for adjusting the position of the quantization window in the word to be reduced as a function of saturation.

21 Claims, 6 Drawing Sheets

ARRANGEMENT AND METHOD FOR RESTRICTING WORD LENGTH

FIELD OF THE INVENTION

The invention relates to an arrangement and a method for restricting word length in equipment where digital signal is processed in word form.

BACKGROUND OF THE INVENTION

Signal is frequently processed as words of a given length in digital equipment. Various operations are performed for digital words, such as correlation and summing, where the word length of a digital word, as a result of an operation, exceeds the word length of the original word. If several such operations occur consecutively, the word length becomes considerably longer than the original word.

In digital equipment words are stored in memories, and the longer the words that are being processed the greater the need for memory capacity. However, it is preferable in equipment particularly intended for portable use that the amount of memory needed can be reduced, as large memories increase the current consumption and price of the equipment and slow down the operation of the equipment. Consequently, the word length is restricted in such situations.

This problem has been encountered, for example, in the receivers used in digital radio networks. Digital word lengths may increase in the receivers, when the received digitized signal is processed. When an analogue signal is conveyed to an A/D converter on the radio path, a 7-bit word is, for example, obtained from the output of the converter. When this word is conveyed from a CDMA receiver to correlators, a 15 to18-bit word is obtained from the output of the correlators. The memory space required by said word is approximately double compared with the original.

A basically simple method that restricts word length is word cut. A digital word can be cut from a particular point. This takes place by forming a quantization window, the length of which equals the length of the desired shorter word, and is thus shorter than the long word to be shortened. The bits remaining outside said quantization window are rejected and the bits inside the window form a new, shorter word.

If the position of the quantization window is fixed, the solution is easy to implement, but then there is a risk that overflow may occur, meaning that significant bits may remain outside the quantization window.

Figure 1A:
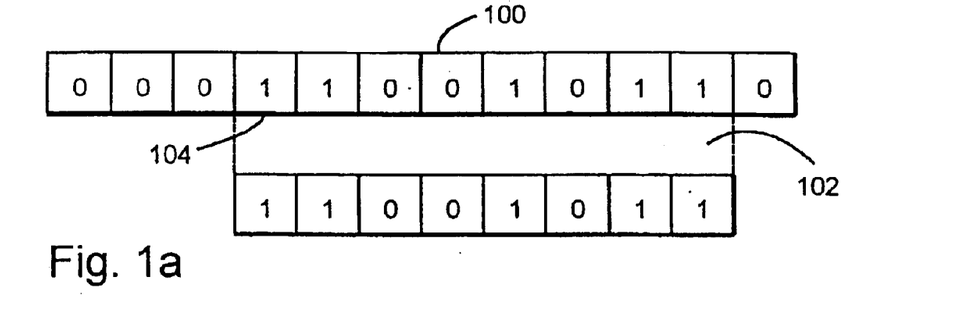
FIGS. 1a–1c show the example described above of shortening a word by cutting.
Figure 1B:
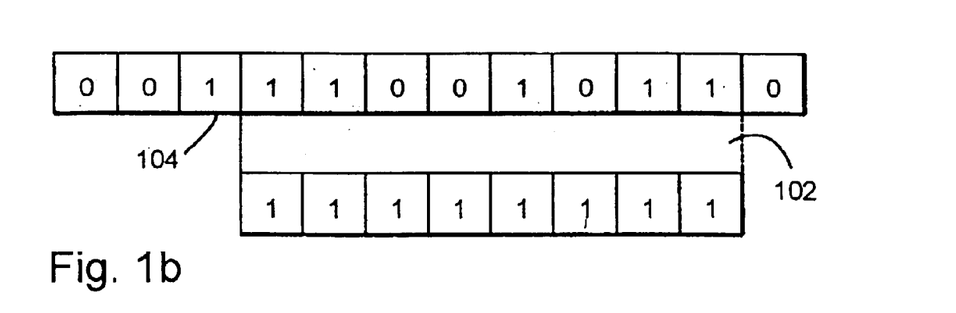
Figure 1C:
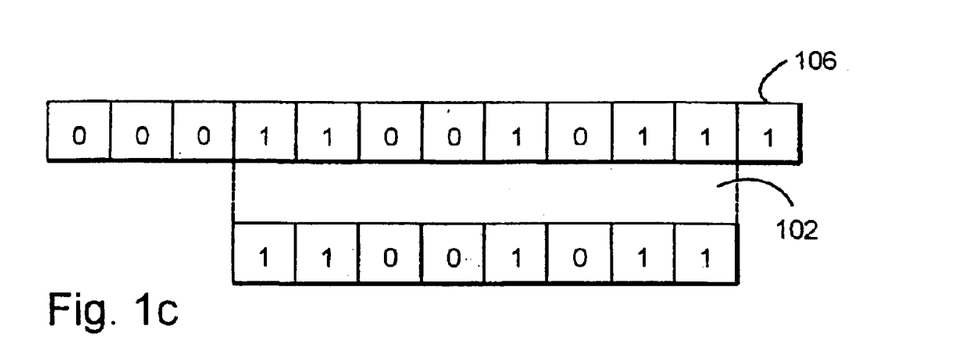

FIGS. 1a–1c illustrate the problem with the fixed window. FIG. 1a shows a long word 100 which comprises 12 bits in this example. The idea is to shorten the word into a word comprising eight bits using a quantization window 102. Overflow of the most significant bits 104 outside the window 102 does not occur in FIG. 1a. In the situation shown in FIG. 1b saturation takes place, when the most significant bit remains outside the window. Saturation is one way of dealing with overflow. When overflow occurs, the largest possible value that can be shown with the word bits is selected as the value of the word. FIG. 1c, in turn, shows how rounding occurs, when the least significant bit 106 remains outside the window.

In prior art solutions the position of the quantization window has been adjusted. This has been implemented on the basis of signal power or strength, but such solutions are difficult to implement as they require complex calculation operations.

BRIEF DESCRIPTION OF THE INVENTION

It is an object of the invention to provide a method and equipment implementing the method so that the word length can be easily restricted. This is achieved with the method for restricting word length comprising the steps of processing digital signal as words of a given length, forming a quantization window to a word, the quantization window being determined to be shorter than the word length, and shortening the word length of the signal by cutting the bits remaining outside the quantization window from the word. The method of the invention also determines the amount of saturation that the shortening of the word length causes, and adjusts the position of the quantization window in the word to be shortened as a function of saturation.

The invention also relates to an arrangement for changing the word length of a digital mode signal comprising means for forming a quantization window to a word, the quantization window being determined to be shorter than the word length, means for shortening the word length by cutting the bits remaining outside the quantization window from the word. The arrangement of the invention further comprises means for determining the amount of saturation caused by the shortening of the word length, and means for adjusting the position of the quantization window in a word to be shortened as a function of saturation.

The preferred embodiments of the invention are disclosed in the dependent claims.

Several advantages are achieved with the method and arrangement of the invention. The solution of the invention is very simple to implement. One counter is needed for calculating the amount of saturation, and one or more shift registers are needed for shifting the window; both being simple and inexpensive components. The other parts can be implemented by software using a simple control program.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

The solution of the invention measures the overflow of the most significant bits outside a quantization window and the saturation caused thereby, i.e. adjusts the position of the quantization window in a word to be shortened as a function of the saturation.

Figure 2:
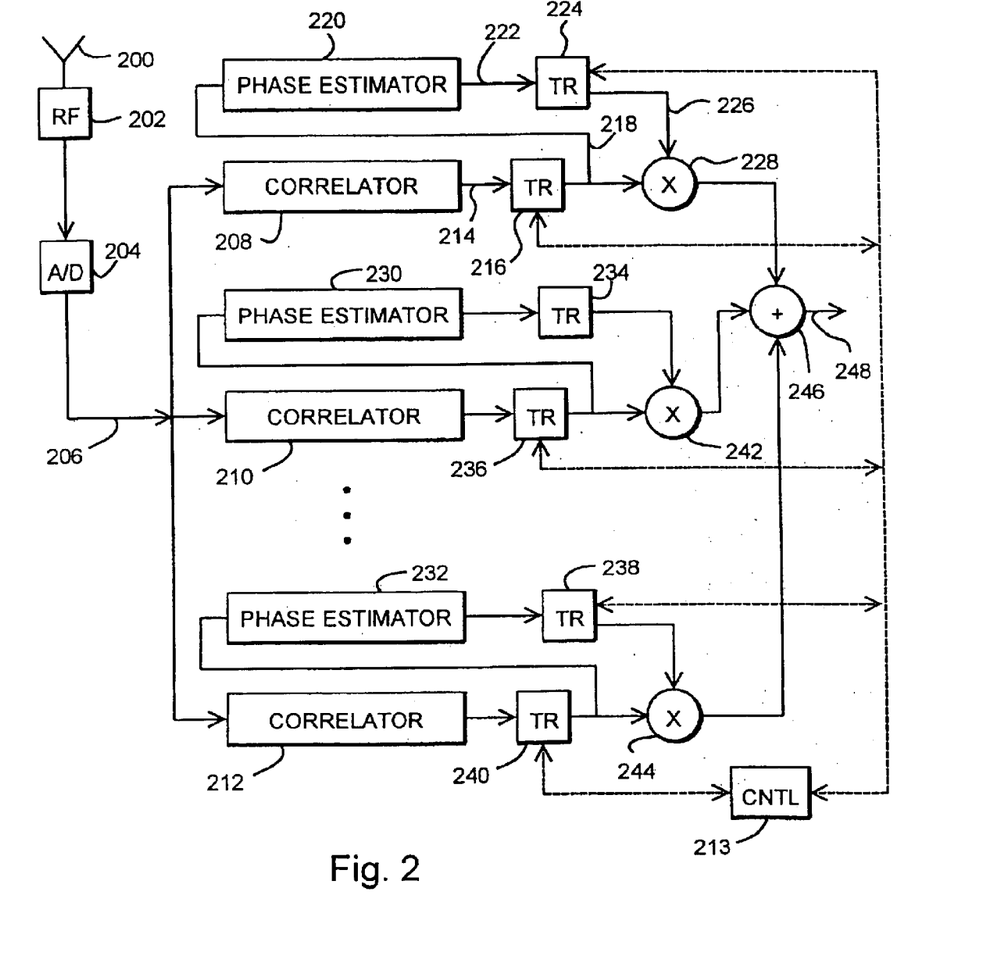
FIG. 2 shows a receiver where a solution of the invention can be applied.

Let us then take a closer look at FIG. 2 which illustrates the function of a receiver according to the invention. In a preferred embodiment of the invention, the invention is applied to a radio system receiver but the invention can naturally be applied to other equipment processing digital signal as is obvious for those skilled in the art.

FIG. 2 illustrates the structure of a RAKE-type receiver. The receiver comprises an antenna 200, by which the received signal is conveyed to an A/D converter 204 after radio frequency parts 202. A digital mode signal 206 comprises in this example words that include 7 bits. These words are conveyed to RAKE correlators 208–151 212, each of which being synchronized to a specific signal component. The signal is correlated in the correlators with a spreading code in a correct phase, and the wideband signal is then restored as a narrowband signal. The number of correlators depends on the receiver. Typically there are one to eight receivers, however, this is not significant for the invention. The receiver also comprises a control unit 213 that controls the function of the receiver.

Let us next take a closer look at the correlator 208 in particular. The word length of an output signal 214 of the correlator 208 has increased owing to the correlation and is typically 15 to 18 bits. Processing this signal and storing it in memory is time consuming, which is why the signal in this solution of the invention is conveyed to a limiter 216 that preferably restricts the word length back to a shorter form, like the word length in the output of the A/D converter, which in this example includes 7 bits. The structure of the limiter is explained in greater detail below. From the output of the limiter 216 a signal 218 is conveyed to a phase estimator 220, in which the phase of the signal component is estimated. The phase estimator typically also increases the word length. An output signal 222 of the estimator thus comprises words, which are longer than the ones in the input of the estimator. The output signal 222 of the estimator is conveyed to a limiter 224 which preferably restricts the word length back to a shorter form. The structure of the limiters 216 and 224 can be identical. The restricted output signal of the phase estimator is connected to the restricted output signal of the correlator in a multiplier 228.

Naturally the above holds true for other receiver correlators too, which are connected with phase estimators 230, 232, limiters 234–240 and multipliers 242, 244.

In a preferred embodiment of the invention the correctors succeeding the correlators are adjusted to the same position i.e. they are all adjusted in the same way. The adjustment can be performed, for example, according to the strongest or average saturation. Other alternatives are also possible. The mutual adjustment can be implemented using the control unit 213. The control unit controls the operation of the different parts of the receiver and may inform all limiters about a desired adjustment position. In order to clarify the Figure, control lines are drawn from the control unit 213 to the limiters only. The control unit can preferably be implemented by means of a processor and appropriate software, or also by separate logic circuits.

The output signals of the correlators 208–212 are preferably connected in a summer 246. The energy in the different signal components can thus be utilized in the receiver. A combined signal 248 is further conveyed to the other parts of the receiver, such as a channel decoder (not shown in the FIG.).

It should be pointed out that applying the solution of the invention to restricting word length is not merely limited to the above parts of the receiver but the description above is only intended as an example.

Figure 3:
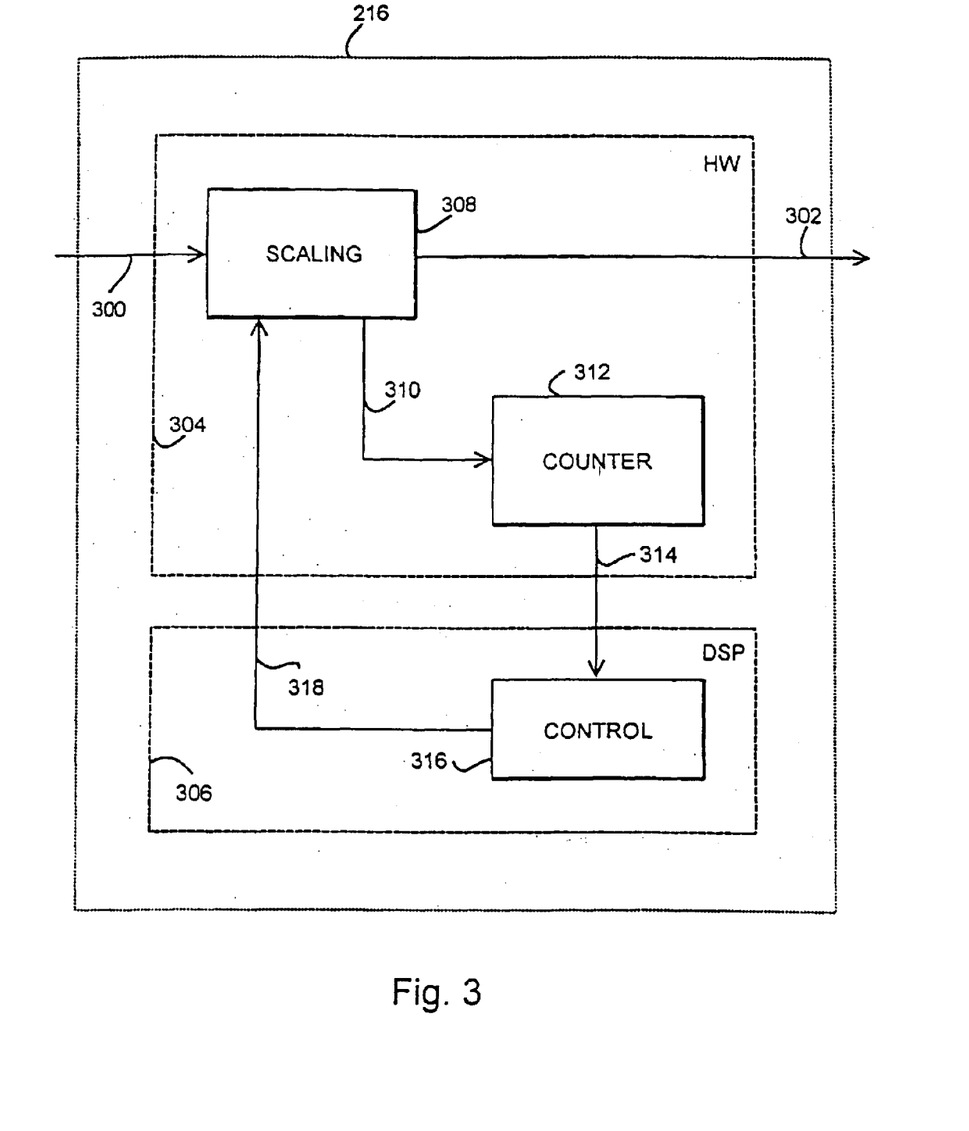
FIG. 3 is a block diagram showing an arrangement of the invention.

Let us then take a closer look at the example shown in FIG. 3 of the limiter according to the invention. A long word is an input signal 300 of the limiter 216 and a short word is an output signal 302. The limiter of the invention can be implemented as a partial apparatus-software implementation, i.e. the limiter comprises an apparatus part 304 and a part 306 implemented by software. Another kind of implementation is also possible. The signal 300 at the input is conveyed in the limiter to scaling means 308 that shorten the word length as explained below. The scaling means also detect if saturation takes place when the word length is reduced. The signal having a reduced word length is conveyed from the scaling means to the output 302. Information 310 about possible saturation is also conveyed from the scaling means to a counter 312. The counter 312 counts the number of saturated words, and indicates a number 314 to a control unit 316 at given intervals, and resets itself to zero. The counter can be implemented in known ways. The given interval may be, for example, 10 ms, or the length of the signal frame or the length of the channel coding period of the signal.

The control unit 316 adjusts the scaling means 308 based on the saturation. The number of saturations that have taken place per a given interval is determined in the control unit. This interval can be the same as the counting interval of the counter but it may also deviate therefrom. However, preferable intervals are the length of the signal frame or the length of the channel coding period of the signal mentioned above. The preferable implementation of the control unit compares the number of saturations obtained with the upper and lower limits of the saturation provided for the signal that are stored in memory, and if the number deviates from the values allowed, then the position of the quantization window have to be changed. The control unit provides information 318 about the quantization window to the scaling means 308.

The receiver of the invention may be able to receive signals sent using different spreading ratios. The receiver may then have different values stored for the upper and lower limits of the saturation for signals sent using different spreading ratios.

Figure 4:
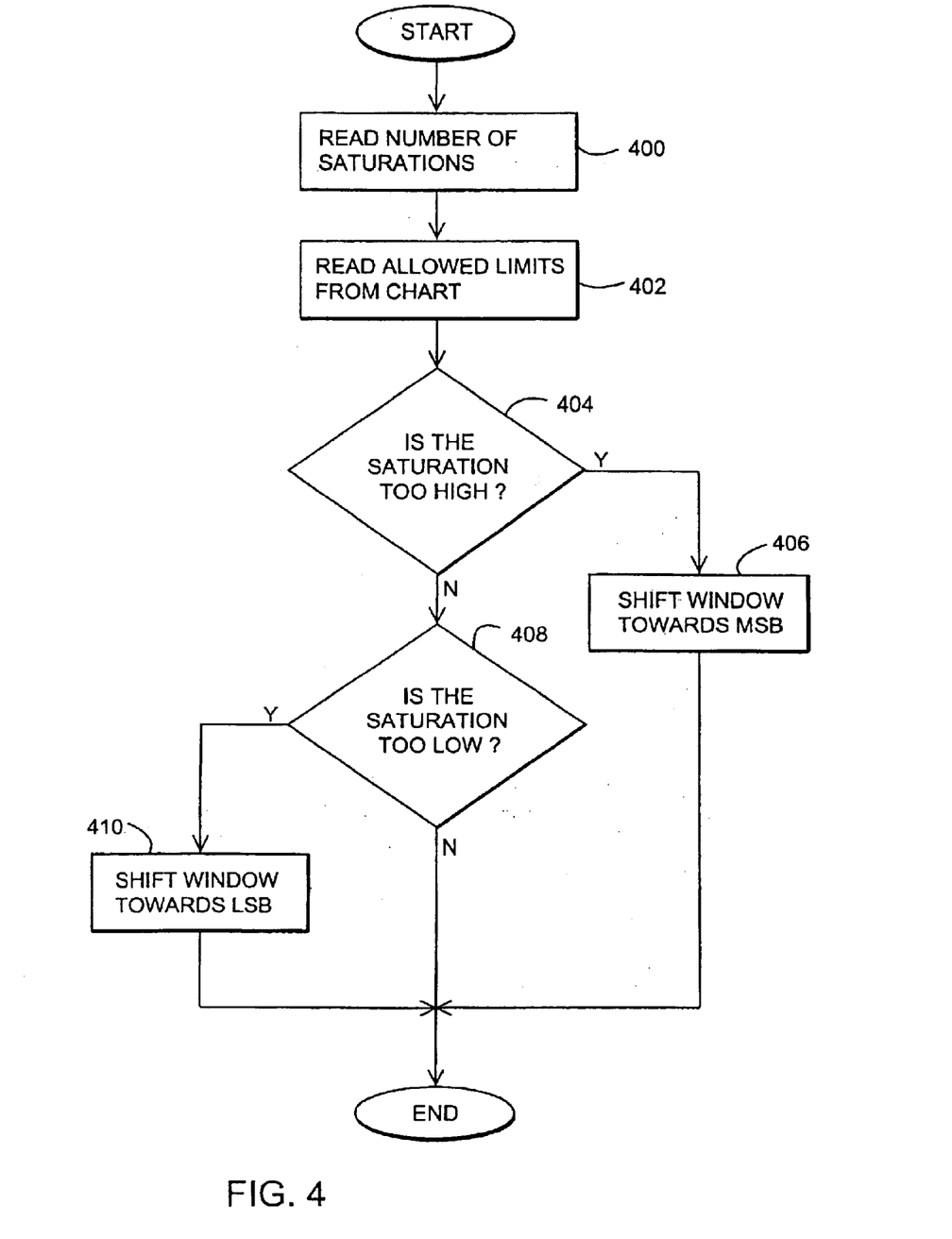
FIG. 4 is a block diagram showing how a quantization window is adjusted.

The control unit 318 can preferably be implemented by software, for example, in a signal processing processor or naturally also by digital components. Let us examine a possible block diagram shown in FIG. 4 of an adjustment program of the control unit scaling means implemented by software. At first the number of saturations is read 400 from the counter. Then 402 the allowed upper and lower limits of the saturation for said signal is read from a memory chart. Naturally in practice this phase does not have to be performed in every phase, only when the signal type changes. Next the number of saturations is compared 404 with the upper limit, and if the upper limit is exceeded, a command 406 is sent to the scaling means to move the quantization window towards the most significant bits. The command may also comprise information about where to move the window. If the upper limit is not exceeded, the number of saturations is compared 408 with the lower limit. If the saturation goes below the lower limit, a command 410 is sent to the scaling means to move the quantization window towards the least significant bits. The command may include information about where to move the window also in this case.

Figures 5A, 5B:
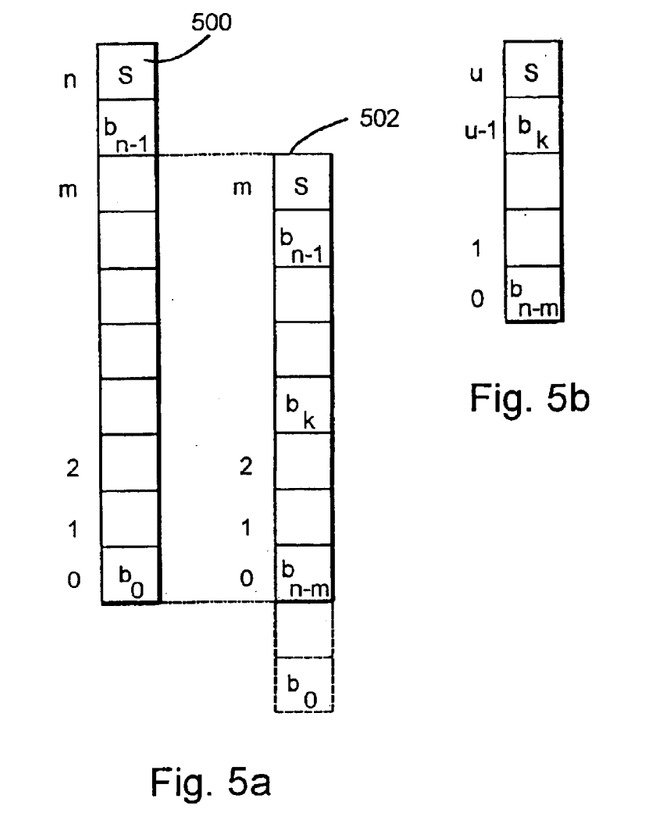
FIG. 5a–5c illustrate word length shortening in scaling means.
Figure 5C:
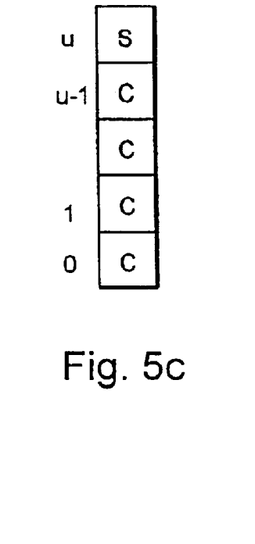

FIGS. 5a–5c illustrate how the scaling means 308 shorten the word length. The scaling means can basically be implemented as a programmable shift register where a word at the input is shifted to the right. FIG. 5a shows on the left an n-bit word 500 comprising bits $b_0 \ldots b_{n-1}$ and a sign bit S. The word may thus be either positive or negative. FIG. 5a shows on the right a word 502 which is shifted approximately m-bits to the right. An m-bit shift to the right corresponds to a division by FIG. $2^m$. Next, u bits forming a shortened word are selected from the shifted bits. The position of the shortened bits in the original n-bit word is determined according to the number of shifts. A possible overflow is checked from bits $b_{k+1}$ . . . $b_{n-1}$, i.e. whether these bits include ones. If not, the content of bits $b_{n-m}$ . . . $b_k$ and a sign bit are selected as the shortened word in accordance with FIG. 5b. If overflow occurs, a bit string, in which terms C are selected so that the absolute value of the word is maximized, is selected as the shortened word in accordance with FIG. 5c. The sign is preserved in both cases.

Figure 6:
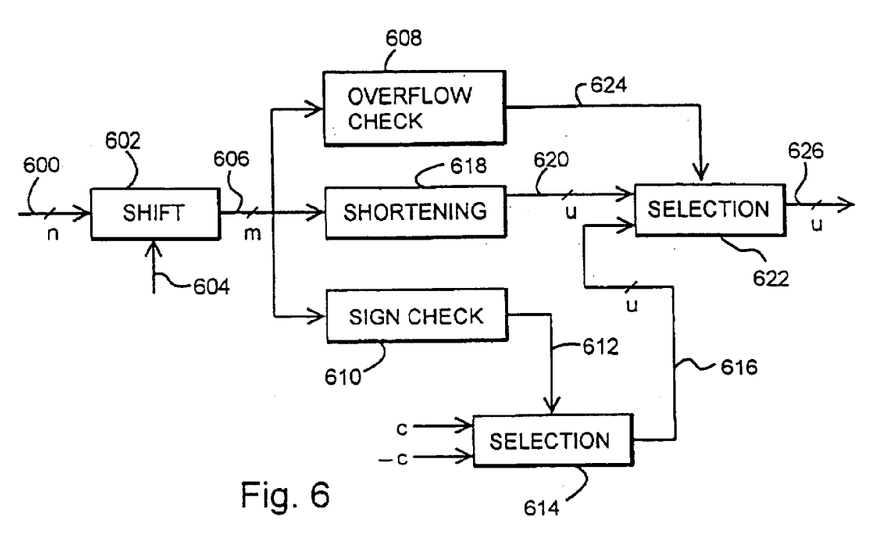
FIG. 6 illustrates an example of the arrangement for shortening word length.

The operation described above can be implemented, for example, using the arrangement shown in FIG. 6. The input of the arrangement comprises an n-bit word 600, which corresponds to the word 500 on the left in FIG. 5a. The word is conveyed to a shift register 602 which receives as input also a control signal 604 that determines to what extent the word has to be moved to the right. The signal arrives from the control unit 316 shown in FIG. 3. A shifted signal 606 at the output of the shift register 602 comprises the shifted m-bit word that corresponds to the word 502 on the right in FIG. 5a. The word 606 is conveyed to an overflow check 608, where a possible overflow of bits $b_{k+}$. . . $b_{n-1}$, is checked. The check can be implemented, for example, by using separate logic circuits or by software. The word 606 is also conveyed to a sign check 610 where the sign S of the word is checked. The check can be implemented, for example, by using separate logic circuits or by software. Information 612 about the sign is conveyed from the sign check 610 to a first selection means 614, where according to the sign a u-bit word having a value of −C or +C, where C is a maximum value that can be presented with a u-bit word, is formed at the output 616 of the selection means 614. If the sign is negative, word −C is selected to the output, and if the sign is positive, word C is selected to the output. The output 616 is connected to a first input of a second selection means 622.

The word 606 is also conveyed to a shortening means 618, where a u-bit word 620 is formed from a desired part of an m-bit word. The shortening means can also be implemented, for example, by using separate logic circuits such as a shift register or preferably by software. From the output of the shortening means the u-bit word 620 is conveyed to a second input of the second selection means 622.

Information 624 about whether overflow has taken place or not is brought from the overflow check 608 to the second selection means 622. Based thereupon the selection means 622 select to an output 626 either the shortened u-bit word 620 corresponding to the word in FIG. 5b, when no overflow takes place, or the maximized u-bit word 616 corresponding to the word in FIG. 5c when overflow takes place. The first and the second selection means 614, 622 can be implemented in ways that are known to those skilled in the art.

Figure 7:
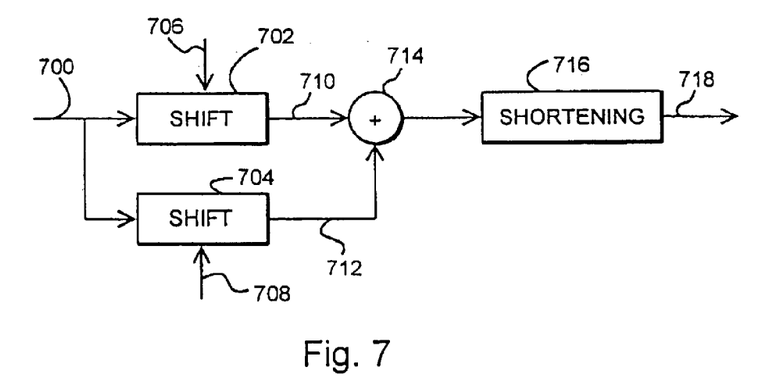
FIG. 7 illustrates another example of shortening the word length and adjusting the quantization window.

FIG. 7 shows another example of an arrangement for shortening word length and for adjusting a quantization window. The arrangement shown enables to move the quantization window using a resolution which is shorter than a bit. As input the arrangement obtains a signal 700 that has a shortened word length and that is conveyed to two parallel programmable shift registers 702, 704. Said registers also obtain control signals 706, 708 which determine how the word bits are moved. Shifted words 710, 712 are then summed in a summer 714 and the summed signal is conveyed to a shortening means 716 which is implemented, for example, as shown in FIG. 6, except for the shift register 602. A signal 718 having a shortened word length is in the output. Two parallel shift registers allow to obtain half-bit shifts. For example, if the upper register 702 does not perform a shift and a one-bit shift is performed in the lower register 704, then the sum signal is multiplied by value 1.5. If no shift is performed in the upper register 702 and the lower register 704 performs a two-bit shift, then the sum signal is multiplied by value 1.25. Naturally there may be more than two parallel registers.

The invention can be applied in various ways depending on the receiver and the signal to be processed within the scope of the inventive idea. For example, if the signal comprises both I and Q branches then the observation of the saturation according to the invention can preferably be performed for the signal of one branch only, but the quantization window can be adjusted in the same way for both signals of the branch.

A preferred embodiment of the invention has above been described in an example case where the word is shown in the sign-absolute value form. However, the preferred embodiments of the invention are not dependent on how the word is presented, but the word can be presented in other forms too, such as the 2-complement form. Then overflow is calculated in such a manner that the presented word requires which can be different from the ones described above, which is obvious for those skilled in the art.

Even though the invention has above been described with reference to the example in the accompanying drawings, it is obvious that the invention is not restricted thereto but can be modified in various ways within the scope of the appended claims.

We claim:

1. A method of restricting word length comprising the steps of:
   processing a digital signal as words of given length,
   applying a quantization window to a word, the quantization window being shorter than the word length, and
   shortening the word length of the signal by cutting the bits remaining outside the quantization window from the word,
   determining an amount of saturation that the shortening of the word length causes, and
   adjusting the position of the quatization window in the word to be shortened as a function of saturation.

2. A method as claimed in claim 1, wherein when the saturation amount is high the quantization window is moved towards the most significant bits in the word.

3. A method as claimed in claim 1, wherein when the saturation amount is low the quantization window is moved towards the least significant bits in the word.

4. A method as claimed in claim 1, wherein the signal is in frame form and that an average value is determined for saturation over one frame.

5. A method as claimed in claim 1, wherein the signal is channel coded and that an average value is determined for saturation over a channel coding period.

6. A method as claimed in claim 1, wherein the signal is channel coded and that the position of the quantization window is adjusted at channel coding period intervals.

7. A method as claimed in claim 1, wherein the method is implemented in a radio network receiver.

8. A method in claim 7, wherein a received signal is changed into digital mode, the digital signal is conveyed to at least one correlator and that output word of the correlator is processed in accordance with said processing step.

9. A method as claimed in claim 8, wherein the digital signal is conveyed to a phase detector and that an output word of the phase detector is processed in accordance with said processing step.

10. A method as claimed in claim 8, further comprising a plurality of correlators receiving said digital signal and wherein a mutual quantization window position is used for shortening the word length of the output word of more than one correlator.

11. A method as claimed in claim 10, wherein saturation is calculated for each correlator and that the mutual quantization window position is selected on the basis of the average saturation of different correlators.

12. A method as claimed in claim 10, wherein saturation is calculated for each correlator and that the mutual quantization window position is selected on the basis of the highest saturation of the different correlators.

13. An arrangement for changing the word length of a digital mode signal comprising:
    means for applying a quantization window to a word, the quantization window being shorter than the word length,
    means for shortening the word length by cutting the bits remaining outside the quantization window from the word,
    means for determining an amount of saturation caused by the shortening of the word length, and
    means for adjusting the position of the quantization window in the word to be shortened as a function of saturation.

14. An arrangement as claimed in claim 13, further comprising a means for detecting that the saturation amount is high and a means for shifting the quantization window towards the least significant bits of the word.

15. An arrangement as claimed in claim 13, further comprising a means for detecting that the saturation is low and a means for shifting the quantization window towards the least significant bits of the word.

16. An arrangement as claimed in claim 13, wherein said shortening means comprises a programmable shift register for shifting a digital word to the right, means for distinguishing a sign from the shifted digital word, means connected to the output of the shift register for distinguishing from the shifted digital word an output word of the same length as the quantization window, a means connected to the output of the shift register for checking whether overflow occurs outside the quantization window, means for forming a maximum or minimum value of a desired word of the same length as the output word on the basis of the sign, means for selecting to the output, on the basis of the overflow check, a value in the quantization window or a value formed on the basis of the sign.

17. An arrangement as claimed in claim 13, further comprising means for converting a signal into digital mode, a set of correlators functionally connected to the output of the converting means, and means for coupling each output word from the correlators to said applying means.

18. An arrangement as claimed in claim 17, wherein each correlator has an associated quantization window, and further comprising means for controlling the position of the quantization window of each correlator to be the same.

19. An arrangement as claimed in claim 18, further comprising the means for determining the average saturation of the different correlators and for controlling the position of the quantization window of each correlator to be the same on the basis of the average saturation.

20. An arrangement as claimed in claim 18, further comprising the means for determining the highest saturation of the different correlators and for controlling the position of the quantization window of each correlator to be the same on the basis of the highest saturation.

21. An arrangement as claimed in claim 13, further comprising means for converting the received signal into digital mode, a phase detector functionally connected to the output of the converting means, and means for coupling the output words of the phase detector to said applying means.

* * * * *